3,347,685
FIRE RETARDANT BITUMINOUS
COMPOSITIONS
Noel D. Blair, Tonawanda, and Claude Thomas Bean, Jr.,
Niagara Falls, N.Y., assignors to Hooker Chemical
Corporation, Niagara Falls, N.Y., a corporation of New
York
No Drawing. Filed Dec. 2, 1963, Ser. No. 327,494
16 Claims. (Cl. 106—15)

This invention relates to novel fire retardant bituminous compositions, and to methods for rendering bituminous materials fire retardant.

Bituminous materials find numerous commercial applications, such as roofing materials, which may be either asphalt shingles or in built-up roofs. Additional uses are in coated or impregnated papers, floor tile and protective coatings, emulsions and paints, for example for coating outdoor wooden structures. These and other uses are better served by bituminous compositions that are fire retardant and flame resistant.

Accordingly, it is an object of this invention to provide fire retardant bituminous compositions. It is a further object of this invention to provide methods for reducing the flammability of bituminous materials to the non-burning state.

Yet another object of this invention is to provide a novel bituminous composition which, when exposed to flame, will generate an intumescent insulating layer and at the same time generate gases of a low order of toxicity upon flame decomposition and destructive distillation of the bituminous film.

These and other objects of the inventions will become apparent as the description of the invention and the examples illustrative of the invention are more fully developed in the specification.

In accordance with this invention there is provided a fire retardant bituminous composition comprised of a bituminous material and a halogenated cyclopentadiene compound selected from the group consisting of (a) bis(dichloroheptafluorocyclopentane), (b) bis(pentachlorocyclopentadienyl), (c) perchlorofulvalene, (d) dodecachlorodihydrotrindene, (e) the reaction product of bis(pentachlorocyclopentadienyl) with ethylene glycol, (f) compounds having the formula

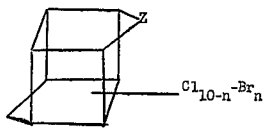

wherein Z is selected from the group consisting of $Cl_2$, and $(OH)[O]^-[NHT_3]^+$;

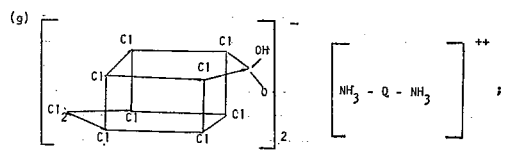

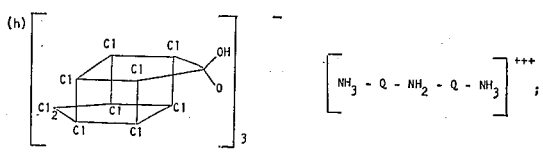

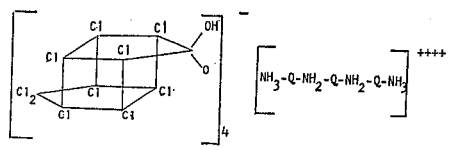

(j) bis(trichlorophenyl) perchlorocyclopentadiene and (k) mixtures thereof; wherein the above formulas each T is independently selected from the group consisting of hydrogen, alkyl and alkylmonohydroxy; Q is an alkyl having 2 to 6 carbon atoms; and $n$ is from 0 to 2 and is 1 to 2 when Z is $Cl_2$.

The compound bis(pentachlorocyclopentadienyl), $C_{10}Cl_{10}$, is prepared by the dechlorination of hexachlorocyclopentadiene. A typical method of preparation is disclosed in United States Patent 2,732,409. This compound melts about 124 degrees centigrade.

The compound perchlorofulvalene, $C_{10}Cl_8$, is prepared by the dechlorination of bis(pentachlorocyclopentadienyl). A typical method of preparation is illustrated by Example 1 below. This compound decomposes without melting at 200 degrees centigrade.

The compound dodecachlorodihydrotrindene, $C_{15}Cl_{12}$, may be prepared by the pyrolysis of bis(pentachlorocyclopentadienyl). Dodecachlorodihydrotrindene melts at about 346 degrees centigrade.

When Z in the above general formula is $Cl_2$ then $n$ is 1 or 2 and a mono or di bromo perchloropentacyclo $[5.2.1.0^{2.6}, 0^{3.9}, 0^{5.8}]$ decane results. Preparation of these compounds are shown in Examples 2 and 3 below. These mono and di brominated compounds melt above 200 degrees centigrade.

Since the balance of the fire retardant pigments of this invention may be considered as derivatives of the previously described pentacyclo structure, nomenclature difficulties may be avoided by referring to this parent structure (see below) as $C_{10}Cl_{10}$:

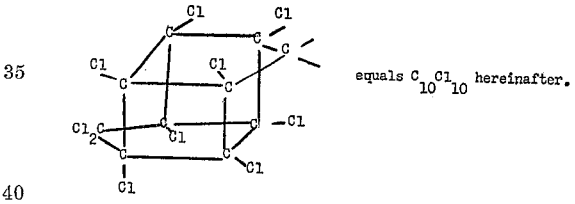

equals $C_{10}Cl_{10}$ hereinafter.

While this structure is believed to be correct, what is meant to describe in this invention are fire retardant bituminous compositions and fire retardant compounds made as described herein, regardless of structure. The literature regarding this basic structure has recently exhibited some shifts in nomenclature for this type of compound.

Amine salts of the type exemplified by the following formulas $[C_{10}Cl_{10}(OH)O]^-[NHT_3]^+$
$[C_{10}Cl_{10}(OH)O]_2^-[NH_3—Q—NH_3]^{++}$
$[C_{10}Cl_{10}(OH)O]_3^-[NH_3—Q—NH_2—Q—NH_3]^{+++}$ and
$[C_{10}Cl_{10}(OH)O]_4^-[NH_3—Q—NH_2—Q—NH_2—Q—NH_3]^{++++}$ are suitable fire retarding compounds in the compositions of this invention. These amine salts are readily prepared by reacting, e.g., by reflux, the $C_{10}Cl_{10}$ hydrates with the desired amine in a suitable solvent for a period of time at moderate temperatures. The hydrates are prepared by hydrolyzing the above described $C_{10}Cl_{10}O$. Suitable amines includes both aromatic and aliphatic amines whether primary, secondary or tertiary. Suitable amines include triethanolamine, ethylenediamine, diethylamine, diethylene triamine, tetraethylenepentamine, hexamethylenetetramine, butylamine, morpholine, pyridine, and aminophenylamine. Useful solvents for the preparation of these salts include the polar solvents such as the ketones, such as the lower ketones, e.g., acetone.

In the foregoing description of the fire retarding compounds of this invention the terms alkyl and aryl unless otherwise qualified are as given below. Alkyl groups contain from 1 to 20 carbon atoms and the preferred alkyls are the lower alkyls having from 1 to 6 carbon atoms. Aryl as used in this invention is to be understood to include aromatic compounds having from 6 to 18 carbon atoms. The most preferred aryl is phenyl.

Many types of bituminous materials are commercially available, ranging from these derived from petroleum (asphaltic products) to those derived from coal tar. The asphaltic products include native asphalts, residual asphalts, blown petroleum asphalts precipitated by propane, fatty-acid pitches, and asphalts modified with oil such as linseed oil, cotton seed oil, castor oil, vegetable oils, and animal oils, and various mixtures thereof. The tar products include pitch obtained by distilling the highly volatile oils from coal tar as well as combinations thereof with oil, gas tar, and water gas tar. These materials are provided in the form of semi-liquids to semi-solids when they are to be used for impregnating felted or woven fabrics in roofing or insulating compositions. The same groups of substances are commonly prepared with a harder consistency and also with a higher fusing point. The latter materials are primarily used for coating or adhesive compositions. The foregoing list of bituminous materials is set forth to provide a better understanding of the type of material contemplated by the term bituminous material. These and other bituminous materials are useful in the present invention.

The fire retarding compounds of the present invention are desirably incorporated in the bituminous materials in an effective fire retardant amount. Generally, fire retarding compounds in the amount of from about 2 to about 50 percent by weight and preferably from about 3 to 30 percent by weight are mixed with bituminous compositions. Improved fire retardants can be provided by incorporating antimony compounds in the bituminous compositions in the amount of about 1 to about 10 percent by weight of said bituminous composition, preferably about 5 percent.

Antimony oxide is antimony compound that is presently preferred for use in the present invention. However, many antimony compounds are suitable. Suitable antimony compounds include the sulfides of antimony, the alkali metal salts of group 1 of the Periodic Table, antimony salts of organic acids and their pentavalent derivatives and the esters of antimonious acids and their pentavalent derivatives. It is convenient to use sodium antimonite or potassium antimonite when it is desired to use an alkali metal salt of the antimony for compositions of this invention. United States Patent 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Also, the esters of antimonious acids and their pentavalent derivatives disclosed in U.S. Patent 2,993,924 such as tris (n-octyl) antimonite, tris (2-ethylhexyl) antimonite, tribenzyl antimonite, tris(beta-choroethyl)antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite.

The fire retardant compounds of this invention additionally exert a stabilizing influence on the bituminous composition. These retardants possess high melting points and tend to remain in the solid state with the application of heat thereby materially reducing the flow of the bituminous material and its ability to spread fire by the dripping of flaming molten bituminous materials. Additionally, the fire retarding compounds of this invention impart a high degree of flexibility to bituminous coatings which is highly desirable when impregnating papers, felts and so forth.

The bituminous compositions have been applied to the substrate with the aid of heat and/or pressure in order to achieve a uniform coating with satisfactory bonding characteristics between the coating and the substrate. However, in many cases the use of heat and/or pressure to achieve a coating has not been convenient and in such cases a solvent has been used to reduce the viscosity of composition to a brushable, sprayable or otherwise plyable consistency. The solvent method is the convenient method for applying bituminous coatings to roofs, fences, bridges, etc., but it suffers from the fire hazard usually associated therewith. Therefore, it is another aspect of this invention to provide fire retardant bituminous compositions when utilizing the solvent method of applying bituminous compositions to substrates. These fire retardant coating compositions may contain from about 5 to 85 percent and usually from about 30 to about 75 percent of the bituminous fire retardant compositions as previously described. Preferably, the compositions will contain from about 50 to 70 percent bituminous fire retardant composition. The balance of the coating composition is a volatile halogenated hydrocarbon solvent which is compatible with the fire retardant compounds in the bituminous material.

The halogenated hydrocarbon solvent of the present composition results in compositions of viscosities in the range of 10 to 1000 centipoises at 25 degrees centigrade. The products of higher viscosity may be thinned by the application of heat in a controlled fashion. One does not have to apply as much heat to thin such compositions to the desired viscosity as would be needed in the absence of the solvent.

The preferred solvent has the boiling point which allows for the rapid evaporation thereof after the application of the invented fire retardant bituminous compositions, yet is employed in such proportion as is of such properties that the uniform coatings are obtained when the composition is applied by spray means. This boiling point is usually in the range of about 30 degrees to about 200 degrees centigrade and preferably is of about 40 degrees to 150 degrees centigrade. The halogenated solvents described are not flammable and exert a "snuffing action," preventing or inhibiting ignition of the coating composition while it is being applied. This snuffing action is particularly important when the invented composition is being sprayed so that minute particles and vapors of bituminous matter are not ignited. The preferred solvent in the invented fire retardant bituminous composition is trichloroethylene, although other halogenated hydrocarbon solvents, preferably chlorinated unsaturated hydrocarbons from 1 to 2 carbon atoms, are used successfully, too. Among the satisfactory solvents, listed with their boiling points are the following:

| Solvent: | Boiling point—degrees cent. |
|---|---|
| Methylene chloride | 40 |
| Trichlorotrifluoroethane | 46 |
| 1,2-dichloroethylene | 60 |
| Chloroform | 61 |
| Trichloroethane | 74 |
| Carbon tetrachloride | 77 |
| Trichloroethylene | 87 |
| Tetrachlorodifluoroethane | 92 |
| Bromochloroethane | 107 |
| Dibromoethane | 110 |
| Perchloroethylene | 121 |
| Unsym-tetrachloroethane | 130 |
| Sym-tetrachloroethane | 146 |

Mixtures of the above solvents may also be used to obtain the evaporation rate, viscosity, flash-fire inhibition or other property desired.

The following examples are presented to illustrate the invention further, without any intention of being limited thereby. All parts and percentages are by weight and all temperatures are in degrees centigrade, unless otherwise indicated.

Example 1.—Preparation of fire retardants

A one-liter, 3 necked flask equipped with a dropping funnel, a mechanical stirrer, a reflux condenser with drying tube, and a gas inlet tube was flame-dried and filled with dry nitrogen, anhydrous ferric chloride (47.25 g.) was weighed into the flask and 500 cc. of distilled anhydrous tetrahydrofuran added rapidly in order to prevent excessive exotherm during the dissolution of the solid. Powdered iron metal (18.0 gr.) was then added, and the mixture was stirred at reflux under a slow stream of nitrogen for one and one-half hours. A solution of 118.8 g. of bis(penta chlorocyclopentadienyl) in 250 cc. of anhydrous tetrahydrofuran was added to the stirred mixture over a five-minute period, while still hot and the resulting dark purple reaction mixture was allowed to stand at room temperature for sixteen hours.

The tetrahydrofuran was then removed by vacuum distillation and 500 cc. of 1:1 mixture of concentrated hydrochloric acid and distilled water were added to the dark, partially solidified residue. After a few minutes of stirring, 250 cc. of benzene was added and stirring was continued for fifteen to twenty minutes. The black insoluble solid was removed by suction filtration, the cake was washed with 800 cc. of hot benzene and the organic layer was separated from the filtrate and was then extracted with dilute hydrochloric acid until the acid washes were almost colorless. The organic layer was then concentrated to dryness under vacuum to leave a violet crystalline residue. Recrystallization of the crystalline residue from 430 cc. of hexane yielded 13.9 g. of $C_{10}Cl_8$ as violet rhombic crystals. A further recrystallization from hexane gave product with the following physical constants:

Calculated for $C_{10}Cl_8$: C, 29.75; Cl, 70.25. Found: C, 29.85; Cl, 69.10.

NW—431 ebullioscopic in benzene. Theory, 404
UV Spectrum—max. 389 m$\mu$ log E 4.61
in Hexane—max. 603 m$\mu$ log E 2.43
MP—decomposes at 200° C.
IR Spectrum—6.51$\mu$, 7.95$\mu$, 8.05$\mu$, 8.61$\mu$, 13.03$\mu$, 14.21$\mu$,

Example 2.—Preparation of $C_{10}Cl_{10}Br_2$

A mixture of perchloroethylene, 280 grams, aluminum chloride, 14 grams, and bromine, 160 grams, was stirred at room temperature for one hour, after which 273 grams of C-56 were added and the temperature was gradually raised to 112 degrees centigrade over a two hour period. The temperature was maintained at 112–120 degrees centigrade for 4½ hours. The reaction mixture was diluted with 480 grams of perchloroethylene and 15 grams of water were added to decompose the catalyst. The reaction mixture was heated to reflux and filtered hot to remove the catalyst hydrolysis products. The filtrate was cooled to +5 degrees centigrade, after which the product was crystallized, filtered, dried free of perchloroethylene, washed with 150 milliliters of acetone and again dried. Product weight: 225 grams.

Analysis for bromine by X-ray: Percent bromine, 25.6. Theoretical for $C_{10}Cl_{10}Br_2$: Percent bromine, 24.0.

A portion of the product was recrystallized from perchloroethylene and analyzed for bromine.
Found: Percent bromine, 25.2.

Example 3.—Preparation of $C_{10}Cl_{11}Br$

A mixture of perchloroethylene, 280 grams bromine, 80 grams, and aluminum chloride, 14 grams, was stirred at room temperature for one hour. Hexachlorocyclopentadiene, 273 grams, was added and the reaction temperature was gradually raised to 116 degrees centigrade and maintained at that temperature for six hours. An additional 5 grams of aluminum chloride and the reaction mixture were stirred at 115 degrees centigrade for an additional 4 hours. The reaction mixture was diluted with 450 grams of perchloroethylene, and 15 milliliters of water was added. After the evolution of hydrogen chloride ceased, the reaction mixture was filtered hot to removed hydrolyzed aluminum chloride catalyst. The product was crystallized by cooling the filtrate to +5 degrees centigrade and was isolated by filtering. The product was then washed with acetone and dried. Weight obtained: 209 grams.

Theoretical analysis for $C_{10}Cl_{10}Br$: Percent bromine, 13.5. Found by X-ray analysis: Percent bromine, 14.2, 14.0.

The procedure of Example 3 is repeated, utilizing carbon tetrachloride in place of perchloroethylene and aluminum bromide in the place of aluminum chloride, also to obtain $C_{10}Cl_{11}Br$.

Example 4.—Preparation of $C_{10}Cl_{10}OH$ triethanolamine salt

To a flask containing 365 parts of water, were added 203.5 parts of $C_{10}Cl_{10}O$ with a water content of 0.96 percent. The mixture was stirred for 8 hours at room temperature, filtered and then was air dried until a water content of approximately 9.27 percent was obtained. 1,081.8 parts of the hydrate were dissolved in acetone and were brought to reflux temperature (approx. 62 degrees). While this temperature was maintained, 298.4 parts of triethanolamine were gradually added over a three-hour period and thereafter the refluxing was continued for an additional 8 hours. Refluxing was discontinued, the solution was gradually cooled to room temperature and the triethanolamine salt was allowed to precipitate at the bottom of the vessel. The salt was then filtered out by conventional means. It was of light tan color, melted at 141–144 degrees and was obtained in a yield of 57.5%.

Example 5.—Preparation of $C_{10}Cl_{10}OH$ ethylene glycol derivative

They were charged 49.1 parts of $C_{10}Cl_{10}O$, 6.2 parts of ethylene glycol and 80 parts of carbon tetrachloride into a three mouthed flask. The mixture was brought to reflux temperature and maintained at reflux temperature for approximately 8 hours, and was constantly agitated during the period of refluxing. Upon standing at room temperature, white crystals appeared. This solid matter melted at over 300 degrees. It was re-dissolved in carbon tetrachloride, cooled to room temperature, filtered and air dried. Fine powdery white crystals were obtained.

Example 6.—Preparation of $C_{10}Cl_{10}OH$ ethylene diamine derivative

They were dissolved 300 parts of $C_{10}Cl_{10}O$ in 244 parts of methanol. Then 38 parts of water were added, with stirring. Thereafter, 100 parts of ethylene diamine were added with stirring. A light precipitate was formed as the temperature was raised to about 45 degrees and thereafter the mixture was boiled for about 10 minutes. After cooling to room temperature the white precipitate was recovered by filtering. Thereafter the precipitate was washed with successive portions of methanol and was air dried at room temperature.

Example 7.—Preparation of base material

Asphalt (60.5 parts) was heated to 200 degrees until melted. The molten asphalt was then removed from the source of heat and 32.5 parts of mineral spirits were added with stirring. Stirring was continued and 7.05 parts of finely divided asbestos fiber (Quebec Asbestos Standard Grade 7R) were added. The mixture was then cooled to room temperature and was used as base material for the flame retardant compositions of the following examples. When it is desirable to prepare compositions with other solvents, such as trichloroethylene, the above procedure is used except that the desired solvent is substituted for a like amount of mineral spirits of Example 7.

Example 8.—Fire retardant compositions

To 100 parts of the base material of Example 7 were added three parts (5 percent based on asphalt content)

of bis(dichloroheptafluorocyclopentane), herein after referred to as $C_{10}Cl_4F_{14}$, and three parts (5 percent based on asphalt content) of antimony oxide with stirring until uniform. The halogen content of this composition was 2.9 percent.

A coating was prepared on three inch by twelve inch saturated asphalt felts (a composition shingle) by applying the above composition with a knife at a coverage rate of two gallons for each 100 square feet (or a film of about 1/16 of an inch in thickness). The strips were allowed to dry until substantially all of the mineral spirits was removed.

Testing was performed to determine the relative flammability of the coating by supporting the strip at an angle of 30 degrees from the vertical, in a draft free hood, and applying a flame from a compressed propane portable blow torch. The torch flame was adjusted to give a 1½ inch inner blue cone, was applied perpendicular to the face of the strip for a period of 15 seconds and was then removed. The self-extinguishing time was recorded. A second 15 second flame application was made immediately after the first flame was extinguished and the self extinguishing time for the second application was recorded. If the specimen was self-extinguishing or did not burn upon the second ignition it was judged to be self-extinguishing by this test. Intumescence was measured at the highest point of rise.

The composition of this invention was self extinguishing in 2.0 seconds after the first ignition and 11.0 seconds after the second ignition. An intumescence of 0.19 inch was observed. The composition was considered to be non-burning.

Additional compositions containing different amounts of $C_{10}Cl_4F_{14}$ were prepared and tested, in the manner of Example 8. Results are summarized below.

*Example 16*

To 100 parts of the bituminous composition of Example 7 were added 18.2 parts of perchlorofulvalene (Example 1) and 3.0 parts of antimony oxide. The resulting composition was tested in the same manner as Example 8. The composition was non-burning and self extinguishing in 2.3 seconds after the first 15 second flame application and 3.8 seconds after the second application. An intumescence of 0.19 inch was observed.

*Example 17*

To 100 parts of the bituminous composition of Example 7 were added 18.2 parts of the dibromoperchloro compound of Example 2 and 3.0 parts of antimony oxide. The resulting composition was tested in the same manner as in Example 8. The composition was self-extinguishing in 2.6 seconds after the first 15 second flame application and 2.9 seconds after the second application. An intumescence of 0.22 inch was observed. This compostion was considered non-burning.

*Example 18*

To 100 parts of the bituminous composition of Example 7 were added 18.2 parts of the monobromoperchloro compound of Example 3 and 3.0 parts of antimony oxide. The resulting composition was tested in the same manner as Example 8. The composition was considered nonburning and an intumescence of 0.44 inch was observed. The composition was self extinguishing in 1.9 seconds after the first 15 second flame application and in 3.6 seconds after the second application.

In the table below is a summary of bituminous compositions containing bis(pentachlorocyclopentadienyl). Tests were the same as described in Example 8.

| Ex. | Fire Retardant | Parts of Retardant | Parts Sb$_2$O$_3$ | Self-Extg. Time (sec.) 1st Appln. | Self-Extg. Time (sec.) 2d Appln. | Intumescence (in.) | Flammability |
|---|---|---|---|---|---|---|---|
| 9 | $C_{10}Cl_4F_{14}$ | 6.1 | 3.0 | 4.0 | 15.7 | 0.27 | Non-burning. |
| 10 | $C_{10}Cl_4F_{14}$ | 12.1 | 3.0 | 2.3 | 7.5 | 0.27 | Do. |
| 11 | $C_{10}Cl_4F_{14}$ | 18.2 | 3.0 | 5.0 | 6.7 | 0.19 | Do. |

*Example 12*

To 100 parts of the bituminous composition of Example 7 were added 3.0 parts of $C_{10}Cl_{10}OH$-triethanolamine salt of Example 4. The resulting composition was tested in the same manner as used in Example 8. The composition was non-burning and self-extinguishing in 2.3 seconds after the first 15 second flame application and 8¼ seconds after the second application of flame.

Additional compositions containing higher amounts of the amine salt of Example 4 were prepared and tested as in Example 8. Results are summarized below.

| Ex. | Parts of Retardant | Parts of Sb$_2$O$_3$ | Self-Extg. Time (Sec.) 1st Appln. | Self-Extg. Time (Sec.) 2d Appln. | Intumescence (in.) | Flammability |
|---|---|---|---|---|---|---|
| 19 | 3.0 | 3.0 | 1.5 | 23.0 | 0.12 | Non-burning. |
| 20 | 6.1 | 3.0 | 3.0 | 9.0 | 0.25 | Do. |
| 21 | 12.1 | 3.0 | 2.5 | 4.0 | 0.12 | Do. |
| 22 | 18.2 | 3.0 | 1.5 | 1.5 | 0.25 | Do. |
| 23 | None | None | 3.0 | Burns | None | Burns. |

| Ex. | Fire Retardant | Parts of Retardant | Parts Sb$_2$O$_3$ | Self-Extg. Time (sec.) 1st Appln. | Self-Extg. Time (sec.) 2d Appln. | Intumescence (in.) | Flammability |
|---|---|---|---|---|---|---|---|
| 13 | Ex. 4 | 6.1 | 3.0 | 2.3 | 5.0 | 0.23 | Non-burning. |
| 14 | Ex. 4 | 12.1 | 3.0 | 1.3 | 4.0 | 0.25 | Do. |
| 15 | Ex. 4 | 18.2 | 3.0 | 2.7 | 6.2 | 0.29 | Do. |

This table is illustrative of results obtainable when other amine salts of the formulas discussed in column 3, lines 39–64 and further illustrated by Examples 25 and 26 are employed in the place of the triethanolamine salt.

Summarized in the table below are fire retardant bituminous compositions containing varying amounts of dedecachlorodihydrotrindene and 3.0 parts of antimony oxide.

These compositions were tested in the procedure of Example 8.

| Example | Parts of Retardant | Self-Extg. Time (Sec.) | | Intumescence (inch) | Flammability |
|---|---|---|---|---|---|
| | | 1st Appln. | 2d Appln. | | |
| 24 | 6.1 | 2.0 | 9.0 | 0.07 | Non-burning. |
| 25 | 12.1 | 1.0 | 3.0 | 0.25 | Do. |
| 26 | 18.2 | 1.0 | 2.0 | 0.18 | Do. |

*Example 27*

To 100 parts of the bituminous composition of Example 7 were added 30 parts of bis(trichlorophenyl) perchlorocyclopentadiene and 3 parts of antimony oxide. The resulting composition was tested in the same manner as in Example 8. The composition was non-burning and self-extinguishing in 2.9 seconds after the first 15 second flame application and in 16.5 seconds after the second 15 second flame application. An intumescence of 0.5 inch was observed.

A second aspect of this invention, reduction of fire hazard during application of the composition, is illustrated by Examples 28 and 29. These compositions consist of 60.5 parts asphalt, 7.0 parts asbestos and 32.5 of solvent. The compositions were tested in the manner of Example 8 except that the compositions contained solvent and were not allowed to dry, so as to simulate a fire hazard existing during application of a bituminous coating to an existing roof.

| Ex. | Solvent | Self-Extg. Time (Sec.) | | Flammability |
|---|---|---|---|---|
| | | 1st Appln. | 2d Appln. | |
| 28 | Mineral Spirits | Burns | | Burns. |
| 29 | Trichloroethylene | 2.0 | 3.6 | Nonburning. |

Results similar to Example 29 are obtained when the solvent is tetrachlorodifluoroethane, dibromoethane, perchloroethane or methylene chloride.

In the foregoing examples, it is evident that not only are the compositions in the instant invention fire resistant, but also as the halogen content of the coating is increased, any dripping tendency of the coating decreases and intumescence is observed. Herein lies one of the great advantages of the invention over prior methods for fire proofing bituminous compositions. The presence of our halogenated compounds and bituminous coatings maintains the viscosity of these coatings high, even at elevated temperatures. By contrast, conventional bituminous compositions drip and run in contact with flames, thereby increasing the fire hazard by spreading the hot melt over the environment.

The temperature of mixing the components of the invention is not critical, ranging from the temperature at which the bituminous material becomes fluid up to the decomposition temperature of the said bituminous material, e.g., about 20 degrees to about 260 degrees centigrade.

The "stabilized" asphalt used in the examples contained asbestos fiber. It is also within the scope of the present invention to use unstabilized asphalts and other bituminous materials as well as to employ other powdered or fibrous fillers, pigments and so forth, that are known in the art. Such substances may be either inorganic or organic in origin and are used to impart weather resistance or color to the surface coatings and for reducing the cost of the finished product. Commonly used additives include silica, limestone, slate dust, clay, black and colored pigments, and calcium carbonate. Various halogenated wax products may also be incorporated in the compositions of the invention.

The pesent bituminous compositions find many commercial applications. They are useful for saturating felts and are subsequently used as shingles or coverings or as intermediate products in the manufacture of prepared roofings and composition shingles for constructing built-up roofs, for the manufacture of bituminized floor coverings, for water proofing cloths, such as tarpaulins, and other applications, in which bituminous saturated felts are commonly used. These bituminous compositions can be used in many coating applications, such as in the manufacture of shingles, siding for home construction, wrapping and packing paper, electrical transmission wire insulation, cords and ropes, bituminized wall board, insulating board and the like, bituminous pipe and asphalt mastic roofs. Other applications include bituminous lacquers and cements. In all such applications, the industrial requirements are becoming more stringent regarding the use of fire retardant bituminous compositions. The compositions of our invention satisfy this fast growing need.

Various changes and modifications may be made and equivalents may be substituted in the invented methods, products and compositions, certain preferred forms of which have been herein described, without departing from the scope of this invention.

What is claimed is:
1. A fire retardant bituminous composition comprising (1) a bituminous material and (2) a halogenated cyclopentadiene compound selected from the group consisting of
 (a) bis(dichloroheptafluorocyclopentane),
 (b) bis(pentachlorocyclopentadienyl),
 (c) perchlorofulvalene,
 (d) dodecachlorodihydrotrindene,
 (e) the reaction product of bis(pentachlorocyclopentadienyl) and ethylene glycol,
 (f) compounds having the formula

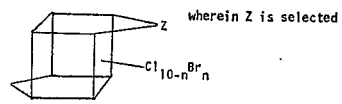

from the group consisting of $Cl_2$ and $$(OH)[O]^-[NHT_3]^+$$

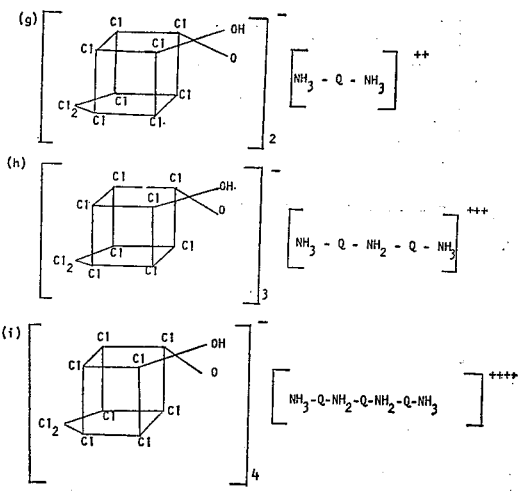

(j) bis(trichlorophenyl) perchlorocyclopentadiene and
 (k) mixtures thereof, wherein T is independently selected from the group consisting of alkyl, hydrogen and alkylmonohydroxy; Q is alkyl containing 2 and 6 carbon atoms and $n$ is a number from 0 to 2 with $n$ being 1 to 2 when Z is $Cl_2$, said halogenated cyclopentadiene compound being present in sufficient proportion up to about 50 percent by weight in the bituminous composition to improve the fire retardancy of the bituminous material.

2. A composition according to claim 1 wherein the fire retardant is bis(trichlorophenyl) perchlorocyclopentadiene.

3. A fire retardant bituminous composition comprised of a fire retardant bituminous composition of claim 1 and a halogenated hydrocarbon solvent.

4. A composition according to claim 1 wherein the fire retardant is bis(dichloroheptafluorocyclopentane).

5. A composition according to claim 1 wherein the fire retardant is bis(pentachlorocyclopentadienyl).

6. A composition according to claim 1 wherein the fire retardant is perchlorofulvalene.

7. A composition according to claim 1 wherein the fire retardant is dodecachlorodihydrotrindene.

8. A composition according to claim 1 wherein the fire retardant is of the formula

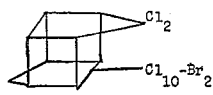

9. A composition according to claim 1 wherein the fire retardant is of the formula

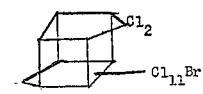

10. A composition according to claim 1 wherein the fire retardant is of the formula

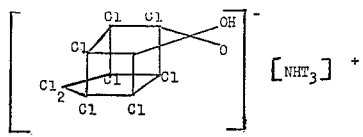

where each T is independently selected from the group consisting of hydrogen, alkyl having 1 to 20 carbon atoms and alkylmonohydroxy having from 1 to 20 carbon atoms.

11. A composition according to claim 1 wherein the fire retardant has the formula

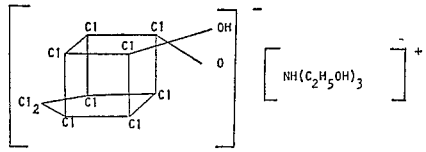

12. A fire retardant bituminous composition according to claim 3 wherein the solvent is trichloroethylene.

13. A fire retardant bituminous composition comprising (1) a bituminous material, (2) from between about two and about fifty percent by weight of a halogenated cyclopentadiene compound selected from the group consisting of
 (a) bis(dichloroheptafluorocyclopentane),
 (b) bis(pentachlorocyclopentadienyl),
 (c) perchlorofulvalene,
 (d) dodecachlorodihydrotrindene,
 (e) the reaction product of bis(pentachlorocyclopentadienyl) and ethylene glycol,
 (f) compounds having the formula

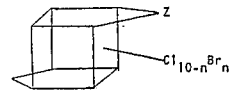

from the group consisting of $Cl_2$, and $$(OH)[O]^-[NHT_3]^+$$

(g) 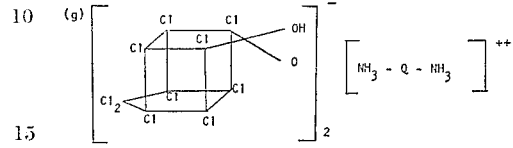

(h) 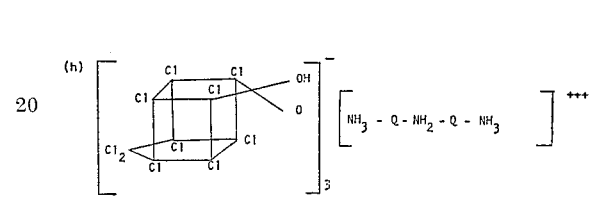

(i) 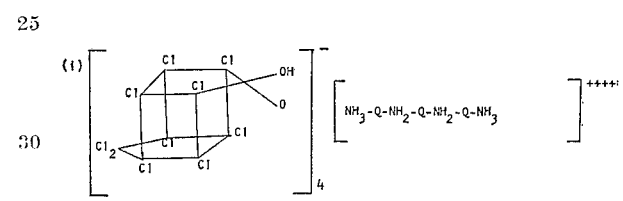

(j) bis(trichlorophenyl) perchlorocyclopentadiene and
(k) mixtures thereof, and (3) from between about one and about ten percent by weight of an antimony compound, wherein T is independently selected from the group consisting of alkyl, hydrogen and alkylmonohydroxy; Q is alkyl containing 2 to 6 carbon atoms and $n$ is a number from 0 to 2 with $n$ being 1 to 2 when Z is $Cl_2$, said halogenated cyclopentadiene compound and said antimony compound being present in sufficient proportion to improve the fire retardancy of the bituminous material.

14. A composition according to claim 13 wherein the antimony compound is antimony oxide.

15. A method for applying a fire retardant bituminous composition to a surface to be coated which comprises applying such composition comprising (a) a composition of claim 1 and (b) halogenated hydrocarbon solvent to the surface to be coated and evaporating the halogenated hydrocarbon from said surface during the application and afterwards to reduce the flammability of the composition at such times and to leave on the surface a fire retardant bituminous coating.

16. A fire retardant bituminous composition shingle wherein the bituminous composition is a composition of claim 1.

References Cited
UNITED STATES PATENTS 3,151,992 10/1964 Blair et al. _____ 106—15
3,202,692 8/1965 Weil et al. _____ 106—15 XR ALEXANDER H. BRODMERKEL, *Primary Examiner.*

L. B. HAYES, *Assistant Examiner.*

UNITED STATES PATENT OFFICE

CERTIFICATE OF CORRECTION

Patent No. 3,347,685                          October 17, 1967

Noel D. Blair et al.

It is certified that error appears in the above identified patent and that said Letters Patent are hereby corrected as shown below:

Column 2, line 62, "includes" should read -- include --.
Column 5, line 40, after "14.21μ" insert -- 14.51μ. --.
Column 8, line 74, "dedecachlorodihydrotrindene" should read -- dodecachlorodihydrotrindene --.

Signed and sealed this 9th day of September 1969.

(SEAL)
Attest:

Edward M. Fletcher, Jr.                      WILLIAM E. SCHUYLER, JR.
Attesting Officer                              Commissioner of Patents